United States Patent Office 3,449,414
Patented June 10, 1969

3,449,414
PRODUCTION OF ALKALI METAL SALTS OF ETHYLENEDIAMINE TETRAACETIC ACID
Guenther Boettger, Ludwigshafen (Rhine), Paul Guenthert, Iggelheim Pfalz, and Hubert Kindler and Hans Stanger, Ludwigshafen (Rhine), Germany, assignors to Badische Anilin- & Soda-Fabrik Aktiengesellschaft, Ludwigshafen (Rhine), Germany
No Drawing. Filed Apr. 19, 1966, Ser. No. 543,546
Claims priority, application Germany, Apr. 30, 1965, B 81,685
Int. Cl. C07c 101/26
U.S. Cl. 260—534                           4 Claims

ABSTRACT OF THE DISCLOSURE

Continuous production of alkali metal salts of ethylenediamine tetraacetic acid by reaction of ethylenediamine(I) with formaldehyde(II) and an alkali metal cyanide(III) in aqueous solution in at least three stages, wherein in the first stage II is reacted with a molar excess of I and III, in the second stage the remainder of II is supplied and in the third stage traces of III are eliminated by reaction with a slight excess of II. The process involves lower operating costs than conventional methods and produces a product of high and consistent quality which can be used without purification or aftertreatment for industrial purposes.

---

This invention relates to a process for the continuous production of alkali metal salts of ethylenediamine tetraacetic acid from ethylenediamine, formaldehyde and an alkali metal cyanide.

It is known that non-aromatic diamines may be reacted with alkali metal cyanides and formaldehyde to form alkali metal salts of diamine polyacetic acids by condensation and hydrolysis. Thus for example the tetrasodium salt or ethylenediamine tetraacetic acid (Trilon B) is formed from ethylenediamine, formaldehyde and sodium cyanide. These substances serve as complex-forming compounds for a great variety of metal ions and have numerous applications. They have hitherto been produced exclusively by batch methods, the amine being united with the alkali metal cyanide, or with an alkali metal hydroxide and hydrocyanic acid, in aqueous solution and formaldehyde being metered in slowly according to the rate of reaction. (See U. S. patent specifications Nos. 2,387,735, 2,407,645 and 2,461,514, German patent specification No. 1,082,914 and British patent specification No. 871,380.)

This method has many disadvantages. Batchwise operation means that during the whole reaction, lasting many hours, continuous supervision of the apparatus is necessary in order to adapt heat supply or cooling and starting material feed to the constantly varying rate of reaction. The quality of the product is subject to great fluctuation, particularly the content of the desired reaction product in the reaction solution, the cyanide content, the formaldehyde content and the color. Owing to the high requirements as to quality which are placed on the sodium salt of ethylenediamine tetraacetic acid (Trilon B) to be used for industrial purposes, aftertreatment and purification of the reaction products is often necessary.

Many individual reactions take place during the reaction. Thus in the production of Trilon B, a total of nine molecules (namely one of ethylenediamine and four each of formaldehyde and sodium cyanide) have to be reacted with each other and moreover four nitrile groups have to be hydrolyzed to carboxyl groups. Ammonia liberated in the reaction may also react with formaldehyde and sodium cyanide and yield nitrilotriacetic acid as well as other products. The complexity of the reaction would make it appear to be impossible to carry out the reaction continuously in practice. Since in complex reaction systems having secondary reactions, higher proportions of secondary products are generally obtained in continuous operation, there appeared to be little probability of any improvement in the quality of the product being achieved by continuous operation.

It is an object of the present invention to provide a continuous method for the production of alkali metal salts of ethylenediamine tetraacetic acid in which the rate of reaction is constant and in which constant supervision of the apparatus is not necessary in order to adapt heat supply or cooling and starting material feed to the course of the reaction. It is another object of this invention to prepare alkali metal salts of ethylenediamine tetraacetic acid in a consistent quality. In particular it is an object of this invention to provide a process according to which solutions of alkali metal salts of ethylenediamine tetraacetic acid can be prepared with a low content of cyanide and formaldehyde, pale color and constant concentrations of products. Another object of this invention is to provide a process according to which alkali metal salts of ethylenediamine tetraacetic acid can be prepared, without aftertreatment and without purification, in such purity that the product may be used for industrial purposes.

These and other objects are achieved in accordance with this invention in a continuous process for the production of alkali metal salts of ethylenediamine tetraacetic acid by reaction of ethylenediamine with formaldehyde and an alkali cyanide in aqueous solution at a temperature of from 60° to 120° C., wherein, in a reactor cascade consisting of at least three stages, ethylenediamine and alkali metal cyanide are used in stoichiometric excess over formaldehyde in at least one stage (main reaction), the remaining amounts of reactants are added in a further stage, and in at least one following stage an after-reaction occurs with such a residence time that the alkali metal cyanide content of the reaction product falls to a concentration of less than 0.1% by weight, ammonia being continuously removed in all of the stages.

The new process yields a product of good and consistent quality which may be used without purification or aftertreatment for industrial purposes and which is distinguished by a low content of alkali metal cyanide. The process involves much lower operating costs than the conventional batchwise method. At the same time considerably higher space-time yields may be achieved than in the batchwise method; when using apparatus having the same effective size, the continuous method has more than twice the production capacity.

Formaldehyde is advantageously used in commercial aqueous solution having a content of 20 to 40% by weight.

Of the alkali metal cyanides, sodium cyanide, which is the cheapest compound, is preferred. The alkali metal cyanide may be used in solid form, but it is advantageous to use aqueous solutions because these can be metered in more easily. It is preferred to use a commercial solution, any slight excess of alkali which is present not having any injurious effect on the reaction. It may even be advantageous to maintain throughout the whole reaction a slight excess of alkali metal hydroxide of about 0.3 to for example 1 mole percent on the cyanide. Alkali metal hydroxide and hydrocyanic acid may also be metered in separately instead of alkali metal cyanide. It is not necessary in this case to use exactly equivalent amounts of alkali metal hydroxide and hydrocyanic acid in every phase of the reaction; it is also possible to meter in a larger amount of alkali metal hydroxide at the beginning.

According to the stoichiometry of the reaction, 4 moles of formaldehyde and 4 moles of alkali metal cyanide (or 4 moles each of alkali metal hydroxide and hydrocyanic acid) are required for each mole of ethylenediamine (hereinafter called diamine for short).

Since formaldehyde and alkali metal cyanide are used up by many secondary reactions, these substances are used in some of the conventional methods in an excess which may amount to 25% of the amount theoretically required. Such an excess is no longer required in the present process. The substances are used in practically stoichiometric amounts, formaldehyde and alkali metal cyanide if desired in an excess of 1 to 2% although substantially more than 5% is by no means necessary and may even unfavorably affect the quality of the product.

The process is carried out in the usual way in aqueous solution, the reaction mixture advantageously containing 25 to 80%, particularly 35 to 70%, of water in each stage.

The process is carried out in a multistage reactor cascade. This means that the reaction mixture flows in succession through a plurality of separate reactions zones. Three or more, advantageously three to eight and particularly two to five separate reaction zones may be used. Examples of suitable reaction zones are agitator vessels, bubble columns, packed towers or similar equipment. The reaction zones may be separate apparatus or separate portions of one apparatus which contains several reaction zones, provided that not more than insignificant mixing takes place between these separate portions. Naturally these reaction zones have an increasing concentration of products. The reaction mixture resulting in the last stage is usually fit for industrial use without further treatment.

The main reaction takes place in at least one of the reaction zones and in a further reaction zone the remainder of the reactants are added. There is then at least one reaction zone for after-reaction.

The main reaction is carried out so that in at least one stage diamine and alkali metal cyanide or alkali metal hydroxide and hydrocyanic acid are metered in a stoichiometric excess with respect to formaldehyde. Stoichiometric excess means an amount which is more than 5%, particularly more than 10%, higher than the amount stoichiometrically required for the reaction. It is not necessary to use alkali metal cyanide and diamine in the same excess over the formaldehyde in the main reaction. Thus it is possible for example to use 90% of the total amount of diamine, 70% of the total amount of alkali metal cyanide and 50% of the total amount of formaldehyde. It is advantageous to meter in during the main reaction more than 60%, particularly from 75 to 95%, by weight of the reactants, and the molar ratio of the reactants metered in is advantageously 1:3 to 4:2 to 3.8 while maintaining the stoichiometric excess of diamine and alkali metal cyanide over formaldehyde.

The main reaction may be carried out in one stage. For this purpose it is advantageous to supply the whole of the diamine and alkali metal cyanide and about 60 to 80% of the amount of formaldehyde. The main reaction may however take place in two to four stages. The said amounts of each of the starting materials may be distributed to all these stages, but it is also possible to supply the whole of the diamine and alkali metal cyanide initially and to distribute merely the formaldehyde to the individual stages.

In a subsequent stage of the reaction, the remainder of the starting materials are supplied, so that these are used in practically stoichiometric amounts. It is advantageous to meter in only formaldehyde into this stage, but diamine, alkali metal cyanide, alkali metal hydroxide and hydrocyanic acid may also be added.

An after-reaction takes place in at least one final stage. This after-reaction may be carried out by varying the residence time, size of the reaction zone and temperature so that the reaction product has an alkali metal cyanide concentration of less than 0.1% by weight, particularly less than 0.05% by weight. This value may be achieved by metering in small amounts of formaldehyde, for example 0.1 to 2% of the amount required for the whole reaction. Correction of the stoichiometry of the reaction may to a certain extent take place in this after-reaction stage at the same time.

For carrying out the process it is of decisive importance that ammonia (which results in the formation of byproducts) should be continuously removed in all stages. This may be carried out in the usual way by liberating steam during the reaction to expel the ammonia, either by working at the boiling point of the reaction mixture at atmospheric pressure or by using a pressure slightly below atmospheric. Water lost during the reaction may readily be compensated for by adding fresh water if the concentration of the reaction product in the discharge is too high. It is advantageous to remove the ammonia by passing a vigorous stream of inert gas, advantageously air, through the reaction mixture. The color of the product is favorably affected by this measure, the reaction mixture obtained being only slightly colored. The stream of inert gas may if desired be passed countercurrent to the liquid through the apparatus or through a portion of the apparatus, and it may be intermediately cooled and the water condensed out may be returned wholly or partly to any point of the apparatus.

The reaction is carried out in the usual way at temperatures of from 60° to 120° C., preferably at 70° to 100° C. The temperature may be the same in all the reaction zones, but it is advantageous to use different temperatures. Thus it is advantageous to select for the after-reaction temperatures which are about 5 to 30°, advantageously 10 to 20° C., higher than for the main reaction.

Atmospheric pressure is used in general but lower or higher pressures may be used, for example from 0.5 to 3 atmospheres.

The total mean residence time of the reaction mixture in the individual zones is in general from 2 to 50 hours, preferably from 4 to 24 hours, 40 to 80% of this being required by the main reaction and the remainder by the after-reaction. The optimum residence time in the individual stages and consequently the size of the reactors may readily be determined by experiment and they are particularly dependent on the temperature chosen.

The invention is illustrated by the following examples.

Example 1

In a four-stage cascade of agitator flasks, each flask having a capacity of two liters, a mixture of 25.6 g. of ethylenediamine as a 78% aqueous solution and 233 g. of sodium cyanide solution as a 28% aqueous solution is introduced in to the first flask each hour. 81 g. per hour of 33% aqueous formaldehyde solution is also metered into the first flask. Another 40 g. per hour of formaldehyde solution of the same concentration is metered into the second flask. All four flasks are blown through with air. The last two flasks serve only for after-reaction and for removal of dissolved ammonia. The temperature in all four flasks is 80° C. The residence period in the first two flasks is about ten hours and the total residence time is about twenty hours. The yield is 108 g. per hour of complex-forming substance, about 90% thereof being the tetrasodium salt of ethylenediamine tetraacetic acid (Trilon B), the balance being Trilon A. The ammonia content of the pale yellow, fully reacted solution, like the cyanide content, is less than 0.02%. No aftertreatment or purification of the reaction mixture is necessary.

Example 2

In a three stage cascade of two-liter agitator flasks, exactly the same procedure as in Example 1 is adopted in the first two flasks. The reaction temperature in each case is 80° C. The third flask is operated at 95° C. Air is blown through all the flasks. The yield and quality of the product are exactly equivalent to Example 1. The total residence time is about fifteen hours.

We claim:

1. A continuous process for the production of alkali metal salts of ethylenediamine tetraacetic acid by reaction of ethylenediamine with substantially stoichiometric amounts of formaldehyde and of an alkali metal cyanide in aqueous solution at a temperature of from 60° C. to 120° C. in at least three stages with continuous supply of the reactants, ethylenediamine and alkali metal cyanide being used in stoichiometric excess over formaldehyde in at least one stage (main reaction), the remainder of the reactants being supplied in a further stage, and after-reaction being allowed to take place in at least one further stage with such a residence time that the alkali metal cyanide content of the reaction discharge falls to a concentration of less than 0.1% by weight, ammonia being continuously removed from all stages, the molar ratio of ethylenediamine, alkali metal cyanide and formaldehyde in the main reaction being 1:3–4:2–3.8.

2. A process as claimed in claim 1 wherein from three to eight stages is used.

3. A process as claimed in claim 1 wherein the content of alkali metal cyanide is decreased to less than 0.1% by weight during the after-reaction by adding formaldehyde.

4. A process as claimed in claim 1 wherein air is passed through each reaction stage.

References Cited

UNITED STATES PATENTS

| | | | |
|---|---|---|---|
| 2,811,550 | 10/1957 | Young | 260—534 |
| 2,945,881 | 7/1960 | Colman et al. | 260—534 |

FOREIGN PATENTS

| | | |
|---|---|---|
| 871,380 | 6/1961 | Great Britain. |
| 1,126,885 | 4/1962 | Germany. |

LORRAINE A. WEINBERGER, *Primary Examiner.*

ALBERT P. HALLUIN, *Assistant Examiner.*